(12) United States Patent
Feske et al.

(10) Patent No.: US 7,045,564 B2
(45) Date of Patent: May 16, 2006

(54) FLAME RETARDANTS WITH HIGH HALOGEN CONTENT AND LOW VISCOSITY

(75) Inventors: Elbert F. Feske, Denham Springs, LA (US); Nelson E. Clark, Baton Rouge, LA (US); Arthur G. Mack, Prairieville, LA (US); Jeffrey Todd Aplin, Baton Rouge, LA (US)

(73) Assignee: Albemarle Corporation, Richmond, VA (US)

( * ) Notice: Subject to any disclaimer, the term of this patent is extended or adjusted under 35 U.S.C. 154(b) by 234 days.

(21) Appl. No.: 10/651,823

(22) Filed: Aug. 29, 2003

(65) Prior Publication Data

US 2005/0045857 A1    Mar. 3, 2005

(51) Int. Cl.
C08K 5/11    (2006.01)
C08K 5/053   (2006.01)

(52) U.S. Cl. .................... 524/306; 524/386; 524/467; 560/79; 560/83; 560/91; 560/92; 560/93; 560/98

(58) Field of Classification Search ................ 524/386, 524/306, 467; 560/79, 83, 91–93, 98
See application file for complete search history.

(56) References Cited

U.S. PATENT DOCUMENTS

| | | | |
|---|---|---|---|
| 3,089,863 A | 5/1963 | Hicks et al. |
| 3,374,208 A | 3/1968 | Seiner et al. |
| 3,455,886 A | 7/1969 | Versnel |
| 3,519,700 A | 7/1970 | Baum |
| 3,676,376 A | 7/1972 | Svoboda et al. |
| 3,929,866 A | 12/1975 | Baldino et al. |
| 3,974,109 A | 8/1976 | Papa et al. |
| 3,989,653 A | 11/1976 | Baldino et al. |
| 4,069,212 A | 1/1978 | Fletcher et al. |
| 4,098,704 A | 7/1978 | Sandler |
| 4,144,395 A | 3/1979 | Murphy et al. |
| 4,209,609 A | 6/1980 | Haas |
| 4,264,745 A | 4/1981 | Foucht |
| 4,303,767 A | 12/1981 | Newkirk et al. |
| 4,307,205 A | 12/1981 | Bershas |
| 4,405,725 A | 9/1983 | Bernard et al. |
| 4,468,481 A | 8/1984 | Barda et al. |
| 4,468,482 A | 8/1984 | Barda et al. |
| 4,564,697 A | 1/1986 | Sutker |
| 4,764,550 A | 8/1988 | Lovenguth et al. |
| 4,912,158 A | 3/1990 | Bohen et al. |
| 4,923,916 A | 5/1990 | Bohen et al. |
| 4,923,917 A | 5/1990 | Bohen |
| 4,938,894 A | 7/1990 | Bohen et al. |
| 4,954,542 A | 9/1990 | Bohen et al. |
| 5,049,697 A | 9/1991 | Bohen et al. |
| 5,102,919 A | 4/1992 | Swab |
| 5,102,923 A | 4/1992 | Porosoff et al. |
| 5,114,985 A | 5/1992 | Kuyzin et al. |
| 5,332,859 A | 7/1994 | Tarbit |
| 5,907,014 A | 5/1999 | Quint |
| 6,218,074 B1 | 4/2001 | Dueber et al. |

FOREIGN PATENT DOCUMENTS

| | | |
|---|---|---|
| EP | 0386406 B1 | 5/1995 |
| GB | 2034726 A1 | 6/1980 |
| WO | WO 03/060000 A1 | 7/2003 |

OTHER PUBLICATIONS

Encyclopedia of Polymer Science and Technology, vol. 11, Plastics, Resins, Rubbers, Fibers, John Wiley & Sons, Inc., 1969, pp. 506-563.
Encyclopedia of Polymer Science and Technology, vol. 15, Plastics, Resins, Rubbers, Fibers, John Wiley & Sons, Inc., 1969, pp. 445-479.
Pape, Peter G, et al., "Tetrabromophthalic Anhydride in Flame-Retardant Urethane Foams", Journal of Cellular Plastics, Nov., 1968, pp. 438-442.

*Primary Examiner*—Peter Szekely
(74) *Attorney, Agent, or Firm*—Jeremy J. Kliebert

(57) ABSTRACT

A flame retardant formulation which is the combination of at least (1) at least one bromine-containing polyol flame retardant formed from the reaction of (a) tetrabromophthalic anhydride, (b) an aliphatic polyol, and (c) an epoxide, and (2) at least one aliphatic diester of an alkane dicarboxylic acid, with the proviso that the formulation has a viscosity at 25° C. of about 20,000 cps or less, and a bromine content of at least about 40 wt %. A flame retardant compound formed from A) tetrabromophthalic anhydride; B) diethylene glycol; C) at least one alpha-omega alkane diol, or at least one alpha-omega alkane diol and at least one aliphatic monool; and D) at least one alkylene oxide; with the proviso that the compound has a viscosity at 25° C. of about 60,000 cps or less, and a bromine content of at least about 43 wt %. Polymer compositions formed from (a) a polyurethane or a polyisocyanurate and (b) a formulation of the invention.

29 Claims, 1 Drawing Sheet

US 7,045,564 B2

FLAME RETARDANTS WITH HIGH HALOGEN CONTENT AND LOW VISCOSITY

TECHNICAL FIELD

This invention pertains to flame retardants that are suitable for use in polyurethanes and polyisocyanurates, and to methods for preparing such flame retardants and the use thereof in polyurethane and polyisocyanurate compositions.

BACKGROUND

Diester/ether diols of tetrabromophthalic anhydride are well known reactive flame retardants. See for example, U.S. Pat. No. 4,564,697 to B. J. Sutker. Such products can have bromine contents of 40 wt % or more. However they are viscous liquids with viscosities in the 80,000 to 200,000 cps range at 25° C., with 100,000 cps being typical. In order to pump such liquid products it is necessary to heat them to elevated temperatures. For example one commercial product with a viscosity at 25° C. in the range of 80,000 to 135,000 cps when heated to 60° C. will typically have a viscosity in the range of 1400 to 2100. To avoid the need for heating the product to reduce its viscosity, a commercially-viable reactive flame retardant product has been produced as a blend of diester/ether diol of tetrabromophthalic anhydride, polyol, and a liquid phosphate ester. Although this product has typical viscosities in the 6000 to 10,000 cps range at 25° C., its bromine content is reduced to a typical value of 36 wt %.

A need thus exists for polyols based on tetrabromophthalic anhydride which are effective as flame retardants, which have low viscosities at 25° C. (e.g., about 20,000 cps or less), which have high halogen contents (e.g., at least about 40 wt %), and which can be produced economically.

SUMMARY OF THE INVENTION

Provided by this invention are (i) new flame retardant compounds and (ii) new flame retardant formulations that satisfy the foregoing need. Because of their high halogen contents and low viscosities, these new flame retardant compounds and new flame retardant formulations are particularly well suited for use in forming flame retardant polyurethanes and polyisocyanurates. This invention also includes process technology for preparing such flame retardants compounds and formulations on an economical basis, and in addition includes the use of such compounds and formulations in forming flame retardant polyurethane polymers, especially polyurethane foams, as well as flame retardant polyisocyanurate polymers and foams produced therefrom.

In a first embodiment of this invention new flame retardant compounds are provided. These new flame retardant compounds of this invention are bromine-containing diols formed from:
A) tetrabromophthalic anhydride;
B) diethylene glycol;
C) one of the following:
  1) at least one alpha-omega alkane diol; or
  2) at least one alpha-omega alkane diol and at least one aliphatic monool; and
D) at least one alkylene oxide;

with the proviso that the compounds have a viscosity at 25° C. of about 60,000 cps or less, preferably about 40,000 cps or less, more preferably about 25,000 cps or less, and a bromine content of at least about 43 wt % and preferably above about 45 wt %.

A second embodiment of this invention provides new flame retardant formulations. These new flame retardant formulations are comprised of (1) at least one bromine-containing polyol flame retardant made from the reaction of (a) tetrabromophthalic anhydride, (b) an aliphatic polyol, and (c) an epoxide, and (2) at least one aliphatic diester of an alkane dicarboxylic acid, with the proviso that the formulation has a viscosity at 25° C. of about 20,000 cps or less, preferably about 15,000 cps or less, more preferably about 10,000 cps or less, and still more preferably about 6000 cps or less, and a bromine content of at least about 40 wt % and preferably above about 43 wt %.

A third embodiment of this invention provides formulations in which a new compound of this invention is used in the formulations. These new flame retardant formulations of this invention are comprised of (1) at least one bromine-containing diol formed from A) tetrabromophthalic anhydride; B) diethylene glycol; C) at least one alpha-omega alkane diol, or at least one alpha-omega alkane diol and at least one aliphatic monool; and D) at least one alkylene oxide; and (2) at least one aliphatic diester of an alkane dicarboxylic acid, with the proviso that the formulation has a viscosity at 25° C. of about 20,000 cps or less, preferably about 15,000 cps or less, more preferably about 10,000 cps or less, and still more preferably about 6000 cps or less, and a bromine content of at least about 40 wt % and preferably above about 43 wt %.

In a fourth embodiment of this invention, a formulation of the second embodiment or of the third embodiment is modified by use of a halogen-containing component therein. Accordingly, this fourth embodiment of this invention provides formulations as described in either of the immediately preceding two paragraphs, further comprising (X) at least one liquid mono- or polyhalohydrocarbon in which the halogen content is one or more chlorine and/or bromine atoms per molecule; (Y) at least one polyhalocarbon in which the halogen content is made up of chlorine and/or bromine atoms; or (Z) both of (X) and (Y), with the proviso that each of (X), (Y), and (Z) has a viscosity of less than about 100 cps at 25° C. These formulations of the fourth embodiment typically have a viscosity at 25° C. of about 20,000 cps or less, preferably about 10,000 cps or less, more preferably about 6000 cps or less, and still more preferably about 4000 cps or less, and a bromine content of at least 40 wt % and preferably above about 43 wt %.

These and other embodiments and features of this invention will be still further apparent from the ensuing description and appended claims.

FURTHER DETAILED DESCRIPTION OF THE INVENTION

Figure 1:
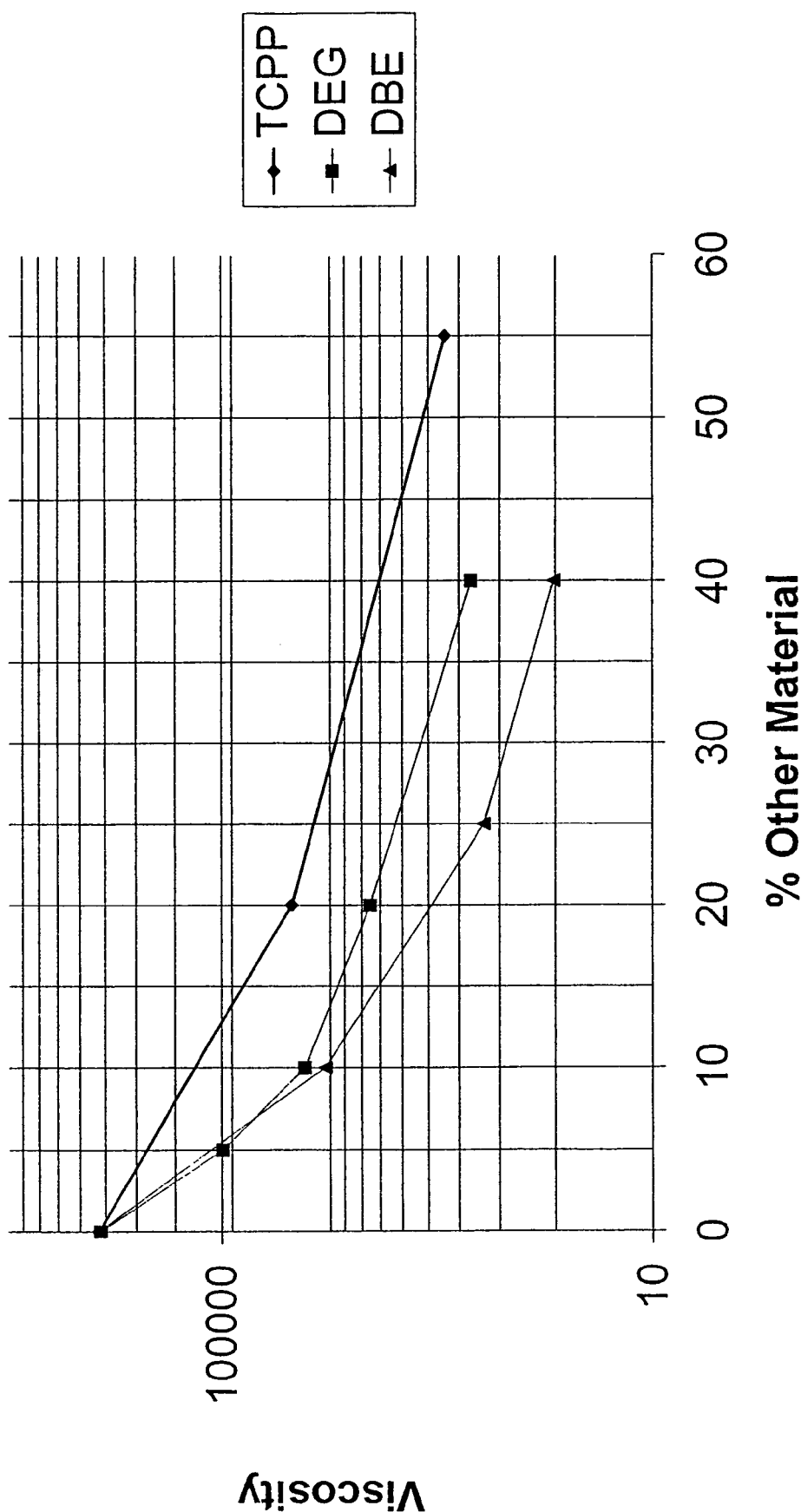
FIG. 1 is a graph on a logarithmic scale of viscosity measurements at 25° C. of three different compositions, one of which is a composition of this invention, the others each being a typical prior art composition.

Demonstration of the Superiority of the Formulations of this Invention

In order to illustrate the excellent results achievable by the practice of this invention, formulations were prepared in which three series of blends were prepared of a commercial bromine-containing polyol flame retardant (specifically, a diester/ether diol of tetrabromophthalic anhydride). In a first series of such blends, the other material of the blends was tris(chloropropyl)phosphate, a material which is used commercially as a means of reducing the viscosity of the foregoing commercial bromine-containing polyol flame retardant. In a second series of such blends the other material of the blends was diethylene glycol. In the third series of such blends, which illustrate the practice of this invention, the other material of the blends was a mixture of dimethyl esters of several aliphatic dibasic acids. In each series of blends the respective components were mixed in various proportions and the physical properties of these blends were determined. In particular, the procedure involved subjecting SAYTEX® RB-79 flame retardant (Albemarle Corporation) to stripping at reduced pressure to remove all solvent material from the product. To this isolated bromine-containing polyol in a pressure bottle was added a weighed quantity of tris(chloropropyl)phosphate. The cap and valve were then attached to the pressure bottle, and the sealed bottle placed in an oven at about 60–80° C. When the contents of the bottle were hot, the bottle was shaken to intimately mix the contents. The bottle and contents were allowed to cool to room temperature, and a sample was retrieved from the bottle and placed in a small sample adapter cup maintained in a controlled temperature water jacket at 25° C. A viscosity determination was then made using a Brookfield viscometer. The contents of the pressure bottle were then further diluted with a weighed quantity of the tris(chloropropyl)phosphate and the same procedure was repeated in order to obtain a viscosity determination on this more dilute blend. In addition, a viscosity determination was made on the isolated bromine-containing polyol in the absence of any other material. This entire procedure was repeated except that in this case the material used with the isolated bromine-containing polyol was diethylene glycol, and in this case a total of four (4) viscosity determinations were made with blends of different known proportions.

In the third series of blends representative of the practice of this invention, the blends tested for viscosity were formed from the isolated bromine-containing polyol and a mixture of dimethylglutarate, dimethyl adipate, and dimethyl succinate (DBE dibasic ester with a specification of 10–25 wt % of dimethyl adipate, 55–65 wt % of dimethylglutarate, and 15–25 wt % of dimethylsuccinate; DuPont). In this case, a total of three viscosity determinations were made with blends of different known proportions.

The results of these respective series of tests are detailed in the following table, and graphically illustrated in FIG. 1. In Table A, DuPont DBE is that which more specifically defined in the preceding paragraph.

TABLE A

| % Additive | First Series (Tris(chloropropyl)-phosphate) Viscosity (cps) | Second Series (Diethylene gloycol) Viscosity (cps) | Third Series (DuPont DBE) Viscosity (cps) |
|---|---|---|---|
| 0 | 1425000 | 1375000 | 1425000 |
| 5 | — | 96560 | — |
| 10 | — | 16870 | 11000 |
| 20 | 22120 | 4250 | — |
| 25 | — | — | 375 |
| 40 | — | 500 | 83 |
| 55 | 875 | — | — |

It can be seen from FIG. 1 that the practice of this invention resulted in substantially greater viscosity reductions as compared to the other blends, at least one of which is representative of commercial practice.

First Embodiment—Compounds of the Invention

As noted above, the new compounds of this invention are made from A) tetrabromophthalic anhydride; B) diethylene glycol; C) at least one alpha-omega alkane diol, or at least one alpha-omega alkane diol and at least one aliphatic monool; and D) at least one alkylene oxide; with the proviso that the compounds have a viscosity at 25° C. of about 60,000 cps or less, preferably about 40,000 cps or less, more preferably about 25,000 cps or less, and a bromine content of at least about 43 wt % and preferably above about 45 wt %.

The new compounds are typically formed by a two-step reaction. In the first step, (i) tetrabromophthalic anhydride, and (ii) diethylene glycol, (iii) at least one alpha-omega alkane diol, or at least one alpha-omega alkane diol and at least one aliphatic monool; are brought together in proportions of about 0.1 to about 1.1 moles of (ii) per mole of (i), and about 0.1 to about 1.1 moles of (iii) per mole of (i) such that there is a total of about 0.5 to about 1.8 moles of (ii) and (iii) per mole of (i). In this connection, when a combination of at least one alpha-omega alkane diol and at least one aliphatic monool is used as (iii), the alpha-omega alkane diol(s) and the aliphatic monool(s) can be used in any proportions relative to each other.

This first-step reaction is typically performed at about atmospheric pressure and at a temperature in the range of about 110° C. to about 140° C., and preferably in the range of about 120 to about 130° C.

Various alpha-omega alkane diols can be used in conducting this first step reaction. Thus, use can be made of such alkane diols as 1,2-ethanediol, 1,3-propanediol, 1,4-butanediol, 1,5-pentanediol, 1,6-hexanediol, 1,7-heptanediol, 1,8-octanediol, and their higher homologs. Preferably the alpha-omega alkane diol(s) used will contain in the range of 2 to about 8 carbon atoms per molecule, and more preferably in the range of 2 to about 4 carbon atoms per molecule.

If one or more aliphatic monools are used in the first-step reaction, the aliphatic monool can be straight-chain or branched-chain and they can be saturated or unsaturated, and if unsaturated, preferably, olefinically unsaturated. In addition aliphatic portion of the monools can contain one or more ether oxygen atoms. Non-limiting examples of such aliphatic monools include methanol, ethanol, 1-propanol, 2-propanol, 1-butanol, 2-butanol, 2-methyl-1-propanol, 2-methyl-2-propanol, 2-methyoxyethanol, 2-ethoxyethanol, diethylene glycol monomethylether, allyl alcohol, 3-butenol, 1-hexanol, 2-ethylhexanol, isodecyl alcohol, and the like. Typically, the aliphatic monool will contain in the range of 1 to about 10 carbon atoms per molecule. Preferably the aliphatic monool(s) used will contain in the range of 1 to about 4 carbon atoms per molecule.

In the second step, the product of the above reaction is contacted with at least one alkylene oxide. For the purposes of this invention, and unless expressly specified otherwise, the term "alkylene oxide" includes haloalkylene oxides. Thus, use can be made of such alkylene oxides as ethylene oxide, propylene oxide, epichlorohydrin, epibromohydrin, 1,2-butylene oxide, 2,3-butylene oxide, 1,2-epoxypentane, 2,3-epoxypentane, 1,2-epoxyhexane, 2,3-epoxyhexane, 3,4-epoxyhexane, and their higher homologs. Mixtures of two or more such alkylene oxides can be employed if desired. The alkylene oxide(s) used will typically contain in the range of 2 to about 10 carbon atoms per molecule. Preferred alkylene oxides will contain in the range of 2 to about 4 carbon atoms per molecule. The proportions used are such that there are in the range of about 1.2 to about 1.9 moles of one or more alkylene oxides per mole of tetrabromophthalic anhydride used in the first step reaction, and such that the acid number (as determined by aqueous sodium hydroxide titration and as expressed in terms of potassium hydroxide) is less than 0.4 and preferably less than 0.2 milligrams of KOH per gram of undiluted product. This second step reaction is typically conducted at a temperature in the range of about 110 to about 140° C., and preferably in the range of about 120 to about 130° C. under pressures in the range of about 10 to about 100 psi, and preferably in the range of about 20 to about 50 psi.

In selecting the alpha-omega alkane diol and, if used the aliphatic monool, the molecular weight of such compound(s) and the proportion thereof used in the reaction tend to be inversely proportional. For example, when using one or more higher molecular weight alpha-omega alkane diols alone as reactant (iii) above the proportion thereof should be kept relatively low within the above specified ranges in order to ensure that the final product will meet the bromine content parameter. Similar considerations apply when using one or more higher molecular weight aliphatic monools along with one or more higher molecular weight alpha-omega alkane diols.

Although typically unnecessary, either or both of the foregoing two step reactions can be conducted in the presence of an inert solvent such as an inert liquid hydrocarbon. However, if such a hydrocarbon solvent is used, it is desirable to remove the solvent such as by flashing or distillation upon completion of the reaction.

Second Embodiment—Formulations of the Invention

In a second embodiment of this invention the new flame retardant formulations are comprised of (1) at least one bromine-containing polyol flame retardant made from the reaction of (a) tetrabromophthalic anhydride, (b) an aliphatic polyol, and (c) an epoxide, and (2) at least one aliphatic diester of an alkane dicarboxylic acid, with the proviso that the formulation has a viscosity at 25° C. of about 20,000 cps or less, preferably about 15,000 cps or less, more preferably about 10,000 cps or less, and still more preferably about 6000 cps or less, and a bromine content of at least about 40 wt % and preferably above about 43 wt %. Desirably, the hydroxyl number of the formulation is in the range of about 90 to about 220. In addition, typically the formulation will have an acid number of no more than about 0.5 mg KOH/g of formulation, and preferably no more than about 0.2 mg KOH/g of formulation.

The aliphatic ester groups of component (2) above, which can be the same or different, are $C_{1-10}$ aliphatic groups which can be straight-chain or branched-chain. Also, these aliphatic groups can be saturated or they can be unsaturated, especially with one or more olefinic bonds. Use of esters having straight-chain aliphatic ester groups is preferred, and more preferred are esters having straight-chain alkyl ester groups. While the alkane moiety can contain up to 10 carbon atoms, dialiphatic esters of $C_2$ to $C_6$ saturated dicarboxylic acids are preferred.

A particularly preferred group of fully saturated straight-chain dicarboxylic acid esters is composed of a single ester or a combination of esters represented by the formula:

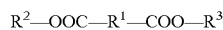

$$R^2\text{—OOC—}R^1\text{—COO—}R^3$$

wherein $R^1$ is —$(CH_2)_w$—; $R^2$ is —$(CH_2)_x$—$CH_3$; and $R^3$ is —$(CH_2)_y$—$CH_3$; and which w is a number from 2 to 4, and each of x and y is, independently, a number from 0 to 5. More preferred is a single ester or a combination of esters of this formula where $R^2$ and $R^3$ are methyl, ethyl, n-propyl, n-butyl, or isobutyl and especially where such $C_{1-4}$ alkyl groups are the same. Even more preferred are the dimethyl esters of succinic acid or glutaric acid or adipic acid, or any mixture of any two or all three of these.

The polyol flame retardants of (1) can be made from a variety of aliphatic polyols and epoxides. Among suitable aliphatic polyols are included, for example, ethylene glycol, propylene glycol, the isomeric butylene glycols, diethylene glycol, 1,5-pentanediol, 1,6-hexanediol, triethylene glycol, glycerol, trimethylolethane, trimethylolpropane, 1,2,6-hexanetriol, pentaerythritol, tetraethylene glycol, dipentaerythritol, sorbitol, sucrose, and alpha-methylglycoside. Mixtures of two or more such aliphatic polyols can be used if desired. Typically, the aliphatic polyol(s) used will contain up to about 18 carbon atoms per molecule.

Non-limiting examples of epoxides that can be used in the production of the polyol flame retardants of (1) include ethylene oxide, propylene oxide, epichlorohydrin, epibromohydrin, 1,2-butylene oxide, 2,3-butylene oxide, 1,2-pentylene oxide, 2,3-pentylene oxide, and any of the several hexylene oxides, heptylene oxides, octylene oxides, 1,2-epoxy dodecane, styrene oxide, and the like. Mixtures of two or more such epoxides can be used. Typically the epoxide(s) used can contain up to about 12 carbon atoms per molecule.

In preparing the polyol flame retardants of (1) a two step reaction is typically employed. In the first step, the tetrabromophthalic anhydride is reacted with the aliphatic polyol. A suitable catalyst is introduced into the reaction mixture. Among suitable catalysts are, for example, magnesium oxide, sodium acetate, potassium acetate, sodium carbonate, and potassium carbonate. Trialkylamines are also suitable catalysts. If desired, an inert solvent such as an inert liquid hydrocarbon can be employed in the first step. In the second step, the epoxide or mixture of epoxides is introduced into the reaction product mixture formed in the first step.

In forming the polyol flame retardants of (1) various ratios of the reactants can be used. Typically these ratios are expressed in terms of equivalents. An equivalent weight of tetrabromophthalic anhydride is one-half of its molecular weight. An equivalent weight of an aliphatic polyol is its molecular weight divided by the number of reactive hydroxyl groups. An equivalent weight of a monoepoxide is one-half its molecular weight. A typical reactant ratio is one equivalent of tetrabromophthalic anhydride to 0.5–10 equivalents of aliphatic polyol to 0.5–20 equivalents of epoxide. A more preferred reactant ratio is one equivalent of tetrabromopbthalic anhydride to 0.75–2.0 equivalents of polyol to 1–10 equivalents of epoxide. Most preferred ratios are one equivalent of tetrabromophthalic anhydride with 0.9–1.5 equivalents of aliphatic polyol and 1–5 equivalents of epoxide.

Temperatures used in the two steps of the reaction will typically fall within the range of about 100 to about 150° C.

Further details concerning the preparation of polyol flame retardants of (1) can be found, for example, in U.S. Pat. Nos. 3,455,886; 4,144,395; 4,564,697; and 5,332,859.

The other component used in the formulations of the second embodiment of this invention is at least one liquid straight-chain aliphatic diester of a straight-chain alkane dicarboxylic acid. Non-limiting examples of such diesters include dimethyloxalate, diethyloxalate, di-n-propyloxalate, di-n-butyloxalate, diisopropyloxalate, diisobutyloxalate, dipentyloxalate, methylethyloxalate, methylbutyloxalate, dimethylmalonate, diethylmalonate, di-n-propylmalonate, di-n-butylmalonate, diisopropylmalonate, diisobutylmalonate, dipentylmalonate, methylethylmalonate, methylbutylmalonate, dimethylsuccinate, diethylsuccinate, di-n-propylsuccinate, di-n-butylsuccinate, diisopropylsuccinate, diisobutylsuccinate, dipentylsuccinate, methylethylsuccinate, methylbutylsuccinate, dimethylglutarate, diethylglutarate, di-n-propylglutarate, di-n-butylglutarate, diisopropylglutarate, diisobutylglutarate, dipentylglutarate, methylethylglutarate, methylbutylglutarate, dimethyladipate, diethyladipate, di-n-propyladipate, di-n-butyladipate, diisopropyladipate, diisobutyladipate, dipentyladipate, methylethyladipate, methylbutyladipate, and analogous liquid straight-chain aliphatic diesters of straight-chain alkane dicarboxylic acids. Preferred as component of (2) of this embodiment are mixtures of such esters, especially mixtures of dimethyl esters. A few non-limiting examples of such preferred mixtures include 55–65 wt % of dimethylglutarate, 10–25 wt % of dimethyladipate, and 15–25% wt % of dimethylsuccinate; 72–77 wt % of dimethylglutarate and 20–28 wt % of dimethyladipate; 85–95 wt % of dimethyladipate and 5–15 wt % of dimethylglutarate; 65–69 wt % of dimethylglutarate and 31–35 wt % of dimethylsuccinate; 55–70 wt % of diisobutylglutarate, 10–20 wt % of diisobutyladipate, and 20–30 wt % of diisobutylsuccinate. Mixtures of this type are available as articles of commerce from DuPont Company.

The amount of component (2) used with component (1) is an amount sufficient to reduce the viscosity of the resultant formulation to a suitably low level of about 20,000 cps or less at 25° C. while maintaining the bromine content of the formulation at a level of at least about 40 wt %. Preferably the resultant formulation has a viscosity of about 15,000 cps or less, more preferably about 10,000 cps or less, and most preferably about 6000 cps or less, and a bromine content of at least about 40 wt % and preferably above about 43 wt %. Desirably, the hydroxyl number of the formulation is in the range of about 90 to about 220. In addition, typically the formulation will have an acid number of no more than about 0.5 mg KOH/g of formulation, and preferably no more than about 0.2 mg KOH/g of formulation.

To form the formulations suitable mixing equipment such as a stirred tank should be used. Preferably, the mixing is conducted with agitation under an inert atmosphere such as nitrogen and with the application of thermal energy sufficient to raise the temperature of the mixture being formed to about 50 to about 100° C. The order of addition of the components is not critical and thus either component can be introduced into the mixing equipment before the other, or both components can be introduced concurrently into the mixing equipment. The time used in the mixing step and the rate of agitation should be sufficient to produce a homogeneous formulation.

Third Embodiment—Formulations of the Invention

In a preferred embodiment of this invention the new flame retardant formulations of this invention are comprised of (1) at least one bromine-containing diol formed from (a) tetrabromophthalic anhydride; (b) diethylene glycol; (c) at least one alpha-omega alkane diol, or at least one alpha-omega alkane diol and at least one aliphatic monool; and (d) at least one alkylene oxide, and (2) at least one straight-chain aliphatic diester of a straight-chain alkane dicarboxylic acid, with the proviso that the formulation has a viscosity at 25° C. of about 20,000 cps or less, preferably about 15,000 cps or less, more preferably about 10,000 cps or less, and still more preferably about 6000 cps or less, and a bromine content of at least about 40 wt % and preferably above about 43 wt %. Desirably, the hydroxyl number of the formulation is in the range of about 90 to about 220. In addition, typically the formulation will have an acid number of no more than about 0.5 mg KOH/g of formulation, and preferably no more than about 0.2 mg KOH/g of formulation.

In conducting this third embodiment, the procedure and materials used are as described in connection with the above second embodiment except that component (1) is one or a mixture of the new compounds of this invention described at the outset hereinabove as the first embodiment of this invention. In addition, while the formulation can be formed by blending the components of this preferred embodiment after formation of component (1), it is desirable to utilize component (2) as an inert solvent for the preparation of the new compound or mixture of new compounds so that the resultant end product from the process already contains the desired component (2). Thus, the amount of component (2) used as a solvent can be adjusted relative to the reactants used in forming the new compound of this invention such that the proportions of components (1) and (2) in the finished product correspond to the desired proportions of the formulation. On the other hand, the amount of component (2) used as a solvent in the preparation of the new compound(s) of this invention can be less than that desired in the resultant formulation. In this case, an additional quantity of component (2) should be added to the product formed in the process to bring the level of component (2) in the resultant formulation up to the desired proportion. Conversely, in preparing the new compound of this invention, an excess amount of component (2) can be used as a solvent for the reaction producing the new compound(s) of this invention whereby the resultant reaction product will contain more of component (2) relative to component (1) than desired. In this case such excess of component (2) can be removed from the resultant reaction product by reduced pressure distillation so that the finished product of this preferred embodiment contains the desired amount of component (2) relative to component (1).

Fourth Embodiment—Formulations of the Invention

Particularly preferred embodiments of this invention are formulations as above described in connection with the second embodiment or the third embodiment with which are blended (X) at least one liquid mono- or polyhalohydrocarbon in which the halogen content is one or more chlorine and/or bromine atoms per molecule; (Y) at least one polyhalocarbon in which the halogen content is made up of chlorine and/or bromine atoms; or (Z) both of (X) and (Y), with the proviso that each of (X), (Y), and (Z) has a viscosity of less than 100 cps at 25° C. These formulations typically have a viscosity at 25° C. of about 20,000 cps or less, preferably about 10,000 cps or less, more preferably about 6000 cps or less, and still more preferably about 4000 cps or less, and a bromine content of at least about 40 wt % and preferably above about 43 wt %. Desirably, the hydroxyl number of the formulation is in the range of about 90 to about 220. In addition, typically the formulation will have an acid number of no more than about 0.5 mg KOH/g of formulation, and preferably no more than about 0.2 mg KOH/g of formulation.

Non-limiting examples of liquid monohalohydrocarbons and polyhalohydrocarbons that can be used in forming the formulations of these particularly preferred embodiments include n-propyl chloride, n-propyl bromide, isopropyl chloride, isopropyl bromide, butyl chloride, butyl bromide, isobutyl chloride, isobutyl bromide, higher homologs of these alkyl monohalides, methylene chloride, bromochloromethane, methylene bromide, ethylene dichloride, ethylene dibromide, 1,1,2-trichloroethane, 1,1,1-trichloroethane, trichloroethylene, chloroform, chlorobenzene, bromobenzene, cyclohexylchloride, cyclohexylbromide, and analogous halohydrocarbons in which the halogen content is either chlorine or bromine, or both. Non-limiting examples of polyhalocarbons that can be used include carbon tetrachloride, carbon tetrabromide, perchloroethylene, and the like. The liquid monohalohydrocarbons and polyhalohydrocarbons that are devoid of unsaturation are preferred.

The amount of liquid mono- or polyhalohydrocarbon(s) and/or liquid polyhalocarbon(s) used in forming the formulations of this particularly preferred embodiment can be varied so long as the viscosity of the resultant formulation is about 20,000 cps or less and the bromine content of the resultant formulation is at least about 40 wt %. Generally speaking, the requisite amount of liquid mono- or polyhalohydrocarbon(s) and/or liquid polyhalocarbon(s) will typically fall within the range of about 0.1 to about 15 wt % based on the total weight of the formulation. However, departures from this range are permissible whenever deemed necessary or advisable in achieving the desired viscosity and bromine content parameters, and are within the contemplation and scope of this invention.

The blending procedures, mixing equipment, and conditions for the mixing or blending (including temperatures) are the same as described above.

Use of the Formulations of this Invention

As noted above, the formulations of this invention are well suited for use as flame retardants in the production of polyurethanes and polyisocyanurates, and especially polyurethane foams and polyisocyanurate foams, both rigid and flexible. The polyurethanes and polyisocyanurates, the foams thereof, and methods of preparing such polymers are very well known in the art and are reported in the literature. See, for example, *Encyclopedia of Polymer Science and Technology*, vol. 11, pgs. 506–563 (1969 Wiley & Sons) and vol. 15, pp. 445–479 (1971 Wiley & Sons), and exemplary U.S. Pat. Nos. 3,974,109; 4,209,609; 4,405,725; 4,468,481; 4,468,482; and 5,102,923. The formulations of this invention can be employed in flame retardant quantities in conducting any known procedure for forming such polymers. Typically, the formulation will be included as one of various additives employed in the polymer formation process and will be employed using typical polymer formation conditions. It is also typical that the flame retardant quantities will fall in the range of about 1 to about 20 wt % of a formulation of this invention based on the total weight of the polyurethane or polyisocyanurate composition.

The following Examples illustrate the invention and are not intended to limit the invention to the embodiments described therein. In all of the following examples, acid number determinations were conducted by dissolving a weighed amount of the sample in a solution composed of 50% isopranol, 2% water and 48% toluene by volume. To this mixture was added 4 to 6 drops of a 1% phenothalien indicator solution and the titration was carried out to the light pink end point with aqueous 0.1 N NaOH solution. The acid number (AN) was calculated according to the following equation: AN=(Normality of NaOH solution×volume of NaOH solution used×56.1)/sample weight.

Hydroxyl number determinations in the following examples were conducted by determining the sample size according to the following formula: sample wt (g)=561/[expected OH number]. The desired amount of sample was then weighed carefully into a flask by difference. To the flask was also weighed an amount of phthalation reagent (prepared advance using only reagent grade chemicals by dissolving 111–116 grams phthalic anhydride and 16–18 grams imidazole in 700 mL pyridine then the mixture is stirred and left standing 12 hours before using) and the weight recorded. The flask is carefully placed in an oil bath that has been preheated to 100–110 degrees C. The flask is swirled carefully after about 5 minutes to make certain all of the sample is dissolved. The sample solution is left in the bath a minimum of 30 minutes. The flask is removed from the oil bath and placed in an ice water bath for 5 minutes or more to cool. If the titration cannot be done quickly, the flask is closed with a clean stopper and placed in a freezer. Distilled water (10 mL) is added to the flask from small repipet and swirled to mix. The mixture is left standing for 2 minutes. Phenolphthalein solution (1%, 5 to 6 drops) is added to the flask. A pH meter is standardized with the appropriate buffers. The flask is placed on a magnetic stirrer and titrated with 0.5 N NaOH to a pink endpoint. The pH is measured at endpoint and the volume of titrant used is recorded. A blank is prepared in the same manner as above with the exception that no sample is added to the respective flask. The hydroxyl number (HN) is calculated according to the following equation: HN=((volume of 0.5N NaOH solution used for sample−volume of 0.5N NaOH solution used for blank)×normality of NaOH solution×56.1)/sample weight.

The weight percent bromine in the products of following examples was determined by use of an x-ray fluorescence spectrometer.

Examples 1 and 2 each illustrate the formation of a formulation of this invention in which, pursuant to this invention, a flame retardant polyol is produced in a viscosity-reducing quantity of an aliphatic diester of an alkane dicarboxylic acid.

EXAMPLE 1

Diethylene glycol (415 g), a mixture of dimethylglutarate, dimethyl adipate, and dimethyl succinate (DBE dibasic ester with a specification of 10–25 wt % of dimethyl adipate, 55–65 wt % of dimethylglutarate, and 15–25 wt % of dimethylsuccinate; DuPont) (250 g) and Na$_2$CO$_3$ (3.6 g) were charged to a 2 L reactor and heated to 120 to 130° C. Prior to the first tetrabromophthalic anhydride addition, some distillate was noted to have been collected in the reactor overhead. This material was added back to the reactor but a large portion flashed out through the open reactor port. Tetrabromophthalic anhydride (1800 g) was then added in 4 equal portions in 15-minute intervals. Additional flashing was noted during the first tetrabromophthalic anhydride addition. The mixture was allowed to stir for 1 hour at 130° C. then 320 g of propylene oxide was added over a 1 hour and 20 minute period. A sample was taken for the acid number determination and the value was estimated to be about 6.7. An additional 43 g of propylene oxide were added and the mixture stirred for 30 minutes at which time the acid number was found to be about 0.68. A further 15 g of propylene oxide were added and the mixture was cooked for 1 hour. A vacuum of about 185 mm Hg was then applied to the mixture. The mixture was stirred under those conditions for about 10 minutes and the vacuum was released. A total of 10 g of liquid had been collected in the reactor overhead. DBE dibasic ester (20 g) was added to the hot product with stirring to replace the distillate and estimated amount of flashed material. The finished product was then drained into bottles and analyzed. The results of the analyses are summarized in Table 1.

TABLE 1

| Property | Result |
|---|---|
| Viscosity (cps at 25° C.) | 34,500 |
| Bromine (wt %) | 45% |
| Hydroxyl number | 130 |
| Acid number (mg KOH/g) | 0.33 |

EXAMPLE 2

Diethylene glycol (495 g), DBE dibasic ester (DuPont) (290 g) and $Na_2CO_3$ (3.6 g) were charged to a 2 L reactor along with 900 g of RB-49 addition. The mixture was heated to 130° C. and the solids allowed to dissolve. Once the solids dissolved the remaining tetrabromophthalic anhydride was added and the mixture stirred at 130° C. for 1 hour. Then 370 g of propylene oxide was added over 1 hour. After 2 hours at 130° C., a sample was taken for the acid number determination and the value was estimated to be about 0.3. An additional 17 g of propylene oxide were added and the mixture stirred for 30 minutes at which time the acid number was found to be about 0.17. A vacuum of about 50 mm Hg was then applied to the mixture. The mixture was stirred under those conditions for about 30 minutes and the vacuum was released. A total of 65 g of liquid had been collected in the reactor overhead. DBE (65 g) was added to the hot product with stirring to replace the distillate and estimated amount of flashed material. The finished product was then drained into bottles and analyzed. The results of these analyses are summarized in Table 2.

TABLE 2

| Property | Result |
|---|---|
| Viscosity (cps at 25° C.) | 5,927 |
| Bromine (wt %) | 42.5% |
| Hydroxyl number | 171 |
| Acid number (mg KOH/g) | 0.04 |

Examples 3 and 4 each illustrate the formation of formulations of this invention in which, pursuant to this invention, a new flame retardant compound of this invention is produced in a viscosity-reducing quantity of an aliphatic diester of an alkane dicarboxylic acid.

EXAMPLE 3

Diethylene glycol (144 g), DBE dibasic ester (DuPont) (195 g), 1,4-butanediol (122) and $Na_2CO_3$ (2.5 g) and tetrabromophthalic anhydride (625 g) were charged to a 2 L reactor and heated to 120 to 130° C. After 10 minutes, the reaction mixture cleared and the remaining tetrabromophthalic anhydride (630 g) was added in one portion. The mixture took 10 minutes to clear and was allowed to stir for 0.5 hour at 130° C. Next, 320 g of propylene oxide was added over a 1 hour period. A sample was taken for the acid number determination and the value was estimated to be about 0.15. A vacuum of about 125 mm Hg was then applied to the hot mixture for 10 minutes. A total of 25 g of liquid had been collected in the reactor overhead. DBE (25 g) was added to the hot product with stirring to replace the distillate and estimated amount of flashed material. The finished product was then drained into bottles and analyzed. Table 3 summarizes the results of these analyses.

TABLE 3

| Property | Result |
|---|---|
| Viscosity (cps at 25° C.) | 14,600 |
| Bromine (wt %) | 45% |
| Hydroxyl number | 149 |
| Acid number (mg KOH/g) | 0.26 |

EXAMPLE 4

Diethylene glycol (206 g), DBE dibasic ester (DuPont) (300 g), 1,4-butanediol (87 g), 2-methoxyethanol (74 g), $Na_2CO_3$ (3.6 g), and tetrabromophthalic anhydride (900 g) were charged to a 2 L reactor and heated to 120–130° C. After 10 minutes the reaction mixture cleared and additional 900 g of tetrabromophthalic anhydride was added as a single addition. The mixture took about 20 minutes to clear and was allowed to stir for 0.5 hour at 130° C. Next 350 g of propylene oxide was added over a 1 hour period. A sample was taken for the acid number determination and the value was estimated to be about 0.9. An additional 25 g of propylene oxide was added and the mixture stirred for 30 minutes at which time the acid number was estimated to be about 0.5. A vacuum of about 50 mm Hg was then applied to the hot mixture for 20 minutes. A total of 98 g of liquid had been collected in the overhead section of the reactor. DBE (80 g) was added to the hot product with stirring to replace the distillate and estimated amount of flashed material. The finished product was then drained into bottles and analyzed. The results of these analyses are summarized in Table 4.

TABLE 4

| Property | Result |
|---|---|
| Viscosity (cps at 25° C.) | 5,483 |
| Bromine (wt %) | 44.6% |
| Hydroxyl number | 114 |
| Acid number (mg KOH/g) | 0.27 |

Examples 5–8 each illustrate the preparation of various formulations of this invention in which a bromine-containing diol is formulated with a mixture of aliphatic diesters of alkane dicarboxylic acids.

EXAMPLE 5

Hexane diol (460 g) and KOAc (3.0 g) were charged to a 2 L reactor and heated to 120 to 130° C. Tetrabromophthalic anhydride (1400 g) was added in 4 portions at 15 minute intervals. The mixture was allowed to stir for 0.5 hour at 130° C. Next, 300 g of propylene oxide was added over a 1 hour period. A sample was taken for the acid number determination and the value was estimated to be about 6.9. A further 30 g of propylene oxide were added and after 30 minutes, the acid number was estimated to be about 0.1. The mixture was purged with nitrogen for 1.5 hours. The light brown/tan finished product was then drained into bottles and analyzed. Table 5 summarizes the results of these analyses of this unformulated product.

TABLE 5

| Property | Result |
| --- | --- |
| Viscosity (cps at 25° C.) | 47,300 |
| Bromine (wt %) | 40.5% |
| Hydroxyl number | 197 |
| Acid number (mg KOH/g) | 0.01 |

EXAMPLE 6

Butane diol (455 g) and NaCO$_3$ (3.6 g) were charged to a 2 L reactor and heated to 120 to 130° C. Tetrabromophthalic anhydride (1800 g) was added in 4 portions at 15 minute intervals. The mixture was allowed to stir for 0.5 hour at 130° C. Next, 361 g of propylene oxide was added over a 1 hour period. A sample was taken for the acid number determination and the value was estimated to be about 14. A further 102 g of propylene oxide were added and after 30 minutes, the acid number was estimated to be less than 0.2. The light brown/tan finished product was then drained into bottles and analyzed. Table 6 summarizes the results of these analyses of this unformulated product.

TABLE 6

| Property | Result |
| --- | --- |
| Viscosity (cps at 25° C.) | 23,760 |
| Bromine (wt %) | 47.2% |
| Hydroxyl number | 198 |
| Acid number (mg KOH/g) | 0.12 |

EXAMPLE 7

Butane diol (455 g) and Na$_2$CO$_3$ (3.6 g) were charged to a 2 L reactor and heated to 120 to 130° C. Tetrabromophthalic anhydride (1800 g) was added in 4 portions at 15 minute intervals. The mixture was allowed to stir for 0.5 hour at 130° C. Next, 460 g of butylene oxide was added over a 1 hour period. A sample was taken for the acid number determination and the value was estimated to be about 3.0. A further 50 g of butylene oxide were added and after 30 minutes, the acid number was estimated to be less than 0.2. The light brown/tan finished product was then drained into bottles and analyzed. Table 7 summarizes the results of these analyses of this unformulated product.

TABLE 7

| Property | Result |
| --- | --- |
| Viscosity (cps at 25° C.) | 22,360 |
| Bromine (wt %) | 45.9% |
| Hydroxyl number | 194 |
| Acid number (mg KOH/g) | 0.11 |

EXAMPLE 8

In these preparations diethylene glycol (DEG) and sodium carbonate were charged to a reactor under a nitrogen atmosphere. The mixture was purged subsurface with nitrogen for 15 minutes and then heated to in the range of 125 to 130° C. Then tetrabromophthalic anhydride (TBPA) was added over a period in the range of 0.5 to 1 hour. The resulting mixture is then stirred for 30 minutes after the tetrabromophthalic anhydride addition is complete. Ethylene oxide (EO) was then added at a rate sufficient to maintain the reaction temperature between 120 and 140° C. When the ethylene oxide addition was complete, the resulting mixture was allowed to stir for 30 minutes and the acid number for the product was determined. If the acid number was greater than 0.2, more ethylene oxide was added, the resulting mixture was held for 30 minutes, and the value was rechecked. This operation was repeated until the acid number was in the desired range, i.e., less than 0.2. Upon attaining the desired acid number, the resultant hot mixture was vacuum stripped for 20–30 minutes. After stripping the resultant mixture, a sample was taken for analysis.

In the respective four preparations the molar ratios of the reactants were as shown in Table 8.

TABLE 8

| Preparation No. | TBPA | DEG | EO |
| --- | --- | --- | --- |
| 1 | 1 | 1.4 | 1.8 |
| 2 | 1 | 1.6 | 1.9 |
| 3 | 1 | 1.5 | 1.9 |
| 4 | 1 | 1.5 | 1.9 |

The properties of the resultant preparations are summarized in Table 9.

TABLE 9

| Preparation No. | Viscosity cps at 25° C. | Acid No. mg KOH/g | Hydroxyl No. | Bromine Wt % |
| --- | --- | --- | --- | --- |
| 1 | 65,380 | 0.31 | 208 | 46.9% |
| 2 | 27,550 | 0.14 | 247 | 45.6% |
| 3 | 38,920 | 0.04 | 232 | 46.2% |
| 4 | 41,910 | 0.06 | 227 | 46.1% |

Two formulations were prepared using samples of each product made in Examples 5–8, including the four products made in Example 8 for a total of 14 formulations. The formulation procedure involved the placement of the respective sample in a pressure bottle and the addition thereto of 5 wt % DBE dibasic ester (DuPont). The cap and valve were then attached to the pressure bottle, and the sealed bottle placed in an oven at about 60–80° C. When the contents of the bottle were hot, the bottle was shaken to intimately mix the contents. The bottle and contents were allowed to cool to room temperature, and a sample was retrieved from the bottle and placed in a small sample adapter cup maintained in a controlled temperature water jacket at 25° C. A viscosity determination was then made using a Brookfield viscometer to obtain the 5 wt % DBE formulation viscosity. The contents of the pressure bottle were then further diluted with a weighed quantity of DBE dibasic ester (Dupont) to obtain a 10 wt % DBE formulation and the same procedure was repeated in order to obtain a viscosity determination on this more dilute blend. The bromine content for each formulation was calculated by multiplying the bromine content of the sample (as determined in the respective example) by the percentage of the sample in the formulation (i.e., by 0.95 in 5 wt % DBE formulations and by 0.9 in 10 wt % DBE formulations).

The viscosity and bromine content of each such sample formulations are summarized in Table 10 below.

TABLE 10

| Ex. | 5 wt % DBE Formulation Viscosity (cps) | 5 wt % DBE Formulation Bromine Content (wt %) | 10 wt % DBE Formulation Viscosity (cps) | 10 wt % DBE Formulation Bromine Content (wt %) |
|---|---|---|---|---|
| 5 | 7750 | 38.5 | 2500 | 36.4% |
| 6 | 5375 | 44.8 | 1875 | 42.5% |
| 7 | 5250 | 43.6 | 1750 | 41.3% |
| 8(1) | 9250 | 44.5 | 3125 | 42.2% |
| 8(2) | 6875 | 43.3 | 2000 | 41.0% |
| 8(3) | 8500 | 43.9 | 2500 | 41.6% |
| 8(4) | 9250 | 43.8 | 2625 | 41.5% |

It should be noted that it has been found that formulations of this invention, when incorporated into polyurethane or polyisocyanurate foams at loadings substantially equivalent to convention formulations, have flame retardant characteristics which are at least substantially equivalent to previously known formulations while also providing the significant advantages of the reduced viscosity and relatively high bromine content characteristics taught herein. Furthermore, it has been observed that the flame retardant formulations of this invention have higher hydrolytic stability, and impart improved processing characteristics to high-water containing (e.g., greater than about 1 wt % of the resin) foam formulations, as compared to previously known phosphorus-containing formulations.

The following Comparative Example involved two separate preparations of a known diester/ether diol of tetrabromophthalic anhydride having the lowest viscosity that could be made using conventional known technology optimized for producing a low viscosity product. The two preparations were combined and subjected to analysis and physical properties of the combined product were determined.

COMPARATIVE EXAMPLE

In these preparations diethylene glycol (DEG) and sodium carbonate were charged to a reactor under a nitrogen atmosphere. The mixture was purged subsurface with nitrogen for 15 minutes and then heated to in the range of 125 to 130° C. Then tetrabromophthalic anhydride (TBPA) was added over a period in the range of 0.5 to 1 hour. The resulting mixture is then stirred for 30 minutes after the tetrabromophthalic anhydride addition is complete. Propylene oxide (PO) was then added at a rate sufficient to maintain the reaction temperature between 120 and 140° C. When the propylene oxide addition was complete, the resulting mixture was allowed to stir for 30 minutes and the acid number for the product was determined. If the acid number was greater than 0.2, more propylene oxide was added, the resulting mixture was held for 30 minutes, and the value was rechecked. This operation was repeated until the acid number was in the desired range, i.e., less than 0.2. Upon attaining the desired acid number, the resultant hot mixture was vacuum stripped for 20–30 minutes. After stripping the resultant mixture, a sample was taken for analysis.

In the respective two preparations the molar ratios of the reactants were as shown in Table 11.

TABLE 11

| Preparation No. | TBPA | DEG | PO |
|---|---|---|---|
| 1 | 1 | 1.6 | 1.8 |
| 2 | 1 | 1.6 | 1.8 |

The properties of the resultant preparations are summarized in Table 12.

TABLE 12

| Preparation No. | Viscosity cps at 25° C. | Acid No. mg KOH/g | Hydroxyl No. | Bromine Wt % |
|---|---|---|---|---|
| 1 and 2 combined | 48,750 | 0.09 | 226 | 44.6 |

In the foregoing description of this invention references have been made to bromine-containing diols of this invention having a viscosity at 25° C. of about 20,000 cps or less, preferably about 15,000 cps or less, and more preferably about 10,000 cps or less, and still more preferably about 6000 cps or less, and a bromine content of at least about 40 wt % and preferably above about 43 wt %. In the most preferred embodiments the bromine-containing diols of this invention have, respectively, a viscosity at 25° C. of 20,000 cps or less, preferably 15,000 cps or less, more preferably 10,000 cps or less, and still more preferably 6000 cps or less, and a bromine content of at least 40 wt % and preferably above 43 wt %.

In addition, reference has been made hereinabove to formulations further comprising (A) at least one liquid mono- or polyhalohydrocarbon in which the halogen content is one or more chlorine and/or bromine atoms per molecule; (B) at least one polyhalocarbon in which the halogen content is made up of chlorine and/or bromine atoms; or (C) both of (A) and (B), with the proviso that each of (A), (B), and (C) has a viscosity of less than about 100 cps at 25° C., which formulations typically have a viscosity at 25° C. of about 20,000 cps or less, preferably about 10,000 cps or less, more preferably about 6000 cps or less, and still more preferably about 4000 cps or less, and a bromine content of at least about 40 wt % and preferably above about 43 wt %. In the most preferred embodiments these formulations have, respectively, a viscosity at 25° C. of 20,000 cps or less, preferably 10,000 cps or less, more preferably 6000 cps or less, and still more preferably 4000 cps or less, and a bromine content of at least 40 wt % and preferably above 43 wt %.

Compounds referred to by chemical name or formula anywhere in this document, whether referred to in the singular or plural, are identified as they exist prior to coming into contact with another substance referred to by chemical name or chemical type (e.g., another component, a solvent, or etc.). It matters not what chemical changes, if any, take place in the resulting mixture or solution, as such changes are the natural result of bringing the specified substances together under the conditions called for pursuant to this disclosure.

Also, even though the claims may refer to substances in the present tense (e.g., "comprises", "is", etc.), the reference is to the substance as it exists at the time just before it is first contacted, blended or mixed with one or more other substances in accordance with the present disclosure.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

All documents referred to herein are incorporated herein by reference in toto as if fully set forth in this document.

This invention is susceptible to considerable variation within the spirit and scope of the appended claims. Therefore the foregoing description is not intended to limit, and That which is claimed is:

1. A flame retardant formulation comprised of (1) at least one bromine-containing polyol flame retardant formed from the reaction of (a) tetrabromophthalic anhydride, (b) an aliphatic polyol, and (c) an epoxide, and (2) at least one aliphatic diester of an alkane dicarboxylic acid, with the proviso that the formulation has a viscosity at 25° C. of about 20,000 cps or less, and a bromine content of about 40 wt % or more.

2. A formulation as in claim 1 wherein said viscosity is about 15,000 cps or less.

3. A formulation as in claim 1 wherein said viscosity is about 10,000 cps or less.

4. A formulation as in claim 1 wherein said viscosity is about 6000 cps or less.

5. A formulation as in any of claims 1–4 wherein said bromine content is above about 43 wt %.

6. A formulation as in any of claims 1–4 wherein the bromine content of said formulation is above 40 wt % and wherein said formulation further comprises (X) at least one liquid mono- or polyhalohydrocarbon in which the halogen content is one or more chlorine and/or bromine atoms per molecule; (Y) at least one polyhalocarbon in which the halogen content is made up of chlorine and/or bromine atoms; or (Z) both of (X) and (Y), with the proviso that each of (X), (Y), and (Z) has a viscosity of about 100 cps or less at 25° C., in an amount such that the viscosity of the resultant formulation is reduced and such that the bromine content, exclusive of (X), (Y), and (Z), is at least 40 wt %.

7. A formulation as in claim 6 wherein the viscosity of said resultant formulation is reduced to 4000 cps or less.

8. A flame retardant formulation comprised of (1) at least one bromine-containing diol formed from A) tetrabromophthalic anhydride; B) diethylene glycol; C) at least one alpha-omega alkane diol, or at least one alpha-omega alkane diol and at least one aliphatic monool; and D) at least one alkylene oxide; and (2) at least one aliphatic diester of an alkane dicarboxylic acid, with the proviso that the formulation has a viscosity at 25° C. of about 20,000 cps or less, and a bromine content of about 40 wt % or more.

9. A formulation as in claim 8 wherein said viscosity is about 15,000 cps or less.

10. A formulation as in claim 8 wherein said viscosity is about 10,000 cps or less.

11. A formulation as in claim 8 wherein said viscosity is about 6000 cps or less.

12. A formulation as in any of claims 8–11 wherein said bromine content is about 43 wt % or above.

13. A formulation as in any of claims 8–11 wherein the bromine content of said formulation is above 40 wt % and wherein said formulation further comprises (X) at least one liquid mono- or polyhalohydrocarbon in which the halogen content is one or more chlorine and/or bromine atoms per molecule; (Y) at least one polyhalocarbon in which the halogen content is made up of chlorine and/or bromine atoms; or (Z) both of (X) and (Y), with the proviso that each of (X), (Y), and (Z) has a viscosity of about 100 cps or less at 25° C., in an amount such that the viscosity of the resultant formulation is reduced and such that the bromine content, exclusive of (X), (Y), and (Z), is at least 40 wt %.

14. A formulation as in claim 13 wherein the viscosity of said resultant formulation is reduced to 4000 cps or less.

15. A flame retardant compound formed from A) tetrabromophthalic anhydride; B) diethylene glycol; C) at least one alpha-omega alkane diol, or at least one alpha-omega alkane diol and at least one aliphatic monool; and D) at least one alkylene oxide; with the proviso that the compound has a viscosity at 25° C. of about 60,000 cps or less, and a bromine content of about 43 wt % or more.

16. A compound as in claim 15 wherein said viscosity is about 40,000 cps or less.

17. A compound as in claim 15 wherein said viscosity is about 25,000 cps or less.

18. A compound as in any of claims 15–17, wherein said bromine content is above about 45 wt % or above.

19. A polymer composition formed from ingredients comprising (a) either a polyurethane or a polyisocyanurate and (b) a flame retardant amount of a formulation according to any of claims 1–4.

20. A polymer composition as in claim 19 wherein said bromine content is above about 43 wt % or above.

21. A polymer composition as in claim 19 wherein the bromine content of said formulation is above 40 wt % and wherein said formulation further comprises (X) at least one liquid mono- or polyhalohydrocarbon in which the halogen content is one or more chlorine and/or bromine atoms per molecule; (Y) at least one polyhalocarbon in which the halogen content is made up of chlorine and/or bromine atoms; or (Z) both of (X) and (Y), with the proviso that each of (X), (Y), and (Z) has a viscosity of about 100 cps or less at 25° C., in an amount such that the viscosity of the resultant formulation is reduced and such that the bromine content, exclusive of (X), (Y), and (Z), is at least 40 wt %.

22. A polymer composition as in claim 21 wherein the viscosity of said resultant formulation is reduced to 4000 cps or less.

23. A polymer composition formed from ingredients comprising (a) either a polyurethane or a polyisocyanurate and (b) a flame retardant amount of a formulation according to claim 5.

24. A polymer composition formed from ingredients comprising (a) either a polyurethane or a polyisocyanurate and (b) a flame retardant amount of a formulation according to claim 6.

25. A polymer composition formed from ingredients comprising (a) either a polyurethane or a polyisocyanurate and (b) a flame retardant amount of a formulation according to claim 7.

26. A polymer composition formed from ingredients comprising (a) either a polyurethane or a polyisocyanurate and (b) a flame retardant amount of a formulation according to any of claims 8–11.

27. A polymer composition as in claim 26 wherein said bromine content is about 43 wt % or above.

28. A polymer composition as in claim 26 wherein the bromine content of said formulation is above 40 wt % and wherein said formulation further comprises (X) at least one liquid mono- or polyhalohydrocarbon in which the halogen content is one or more chlorine and/or bromine atoms per molecule; (Y) at least one polyhalocarbon in which the halogen content is made up of chlorine and/or bromine atoms; or (Z) both of (X) and (Y), with the proviso that each of (X), (Y), and (Z) has a viscosity of about 100 cps or less at 25° C., in an amount such that the viscosity of the resultant formulation is reduced and such that the bromine content, exclusive of (X), (Y), and (Z), is at least 40 wt %.

29. A polymer composition as in claim 28 wherein the viscosity of said resultant formulation is reduced to 4000 cps or less.

* * * * *